July 2, 1935.  J. G. JACKSON ET AL  2,006,768
METER BLOCK CONNECTER
Filed July 22, 1931  3 Sheets-Sheet 2
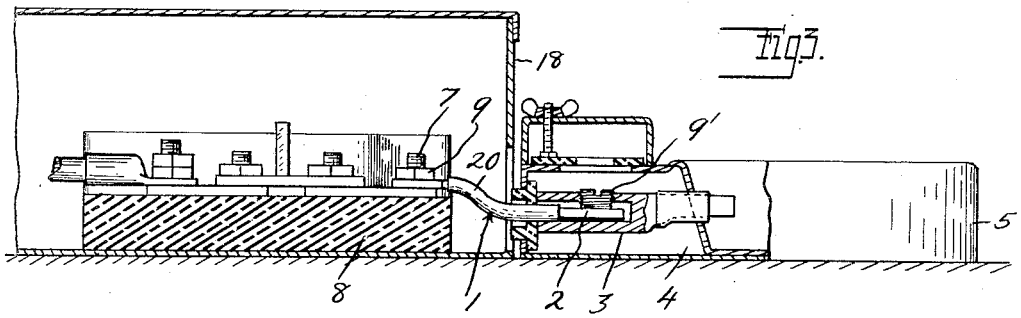
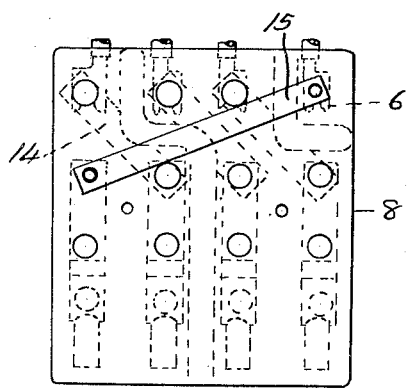
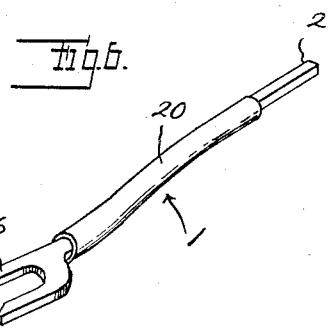
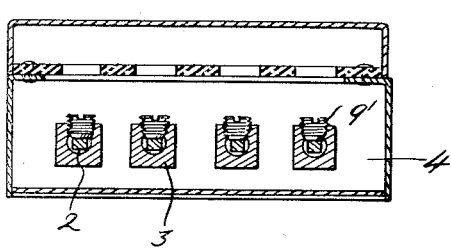
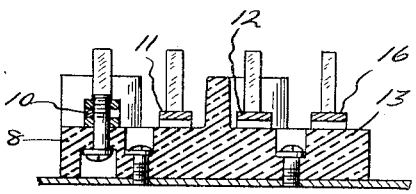
INVENTORS
John G. Jackson
Clement W. Wolf
BY
ATTORNEYS July 2, 1935.　　　J. G. JACKSON ET AL　　　2,006,768
METER BLOCK CONNECTER
Filed July 22, 1931　　　3 Sheets-Sheet 3
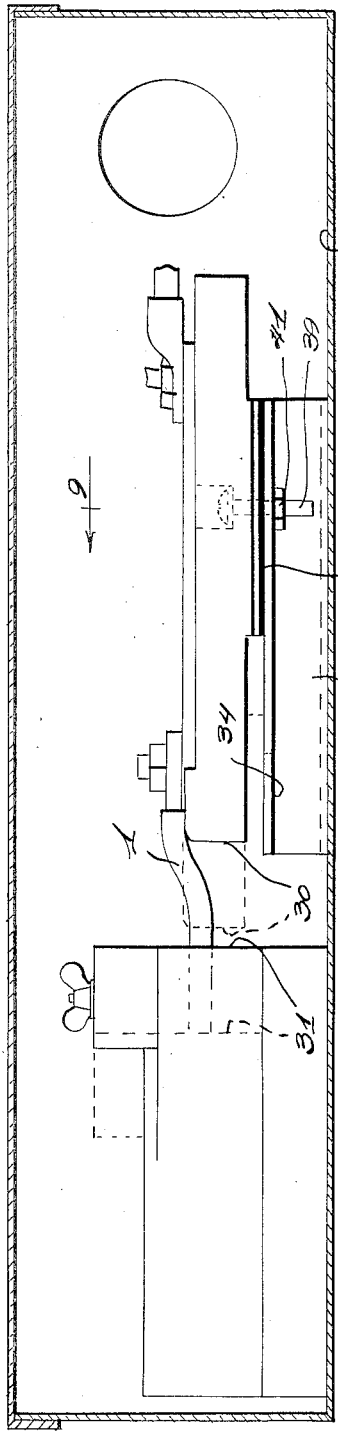
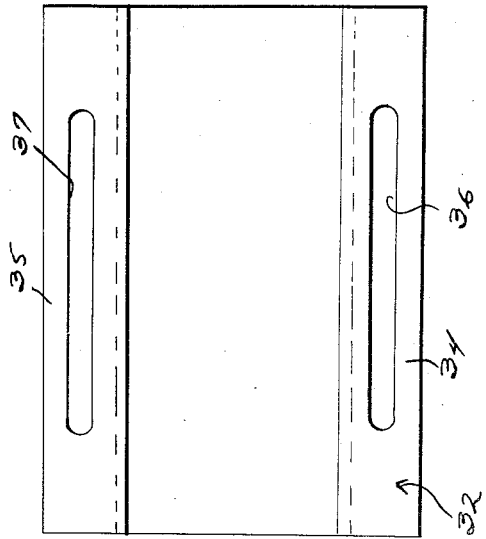
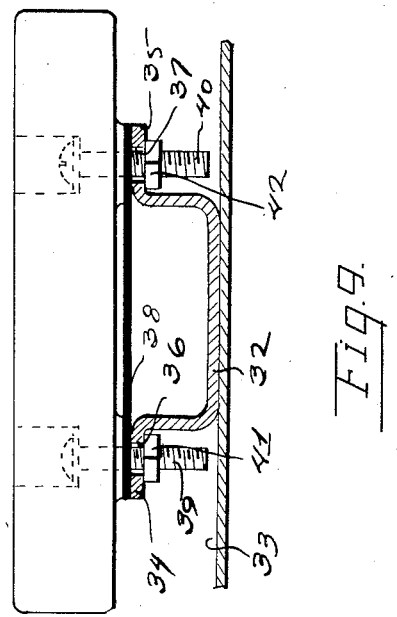
INVENTORS
John G. Jackson
Clement W. Wolf
BY
ATTORNEYS Patented July 2, 1935

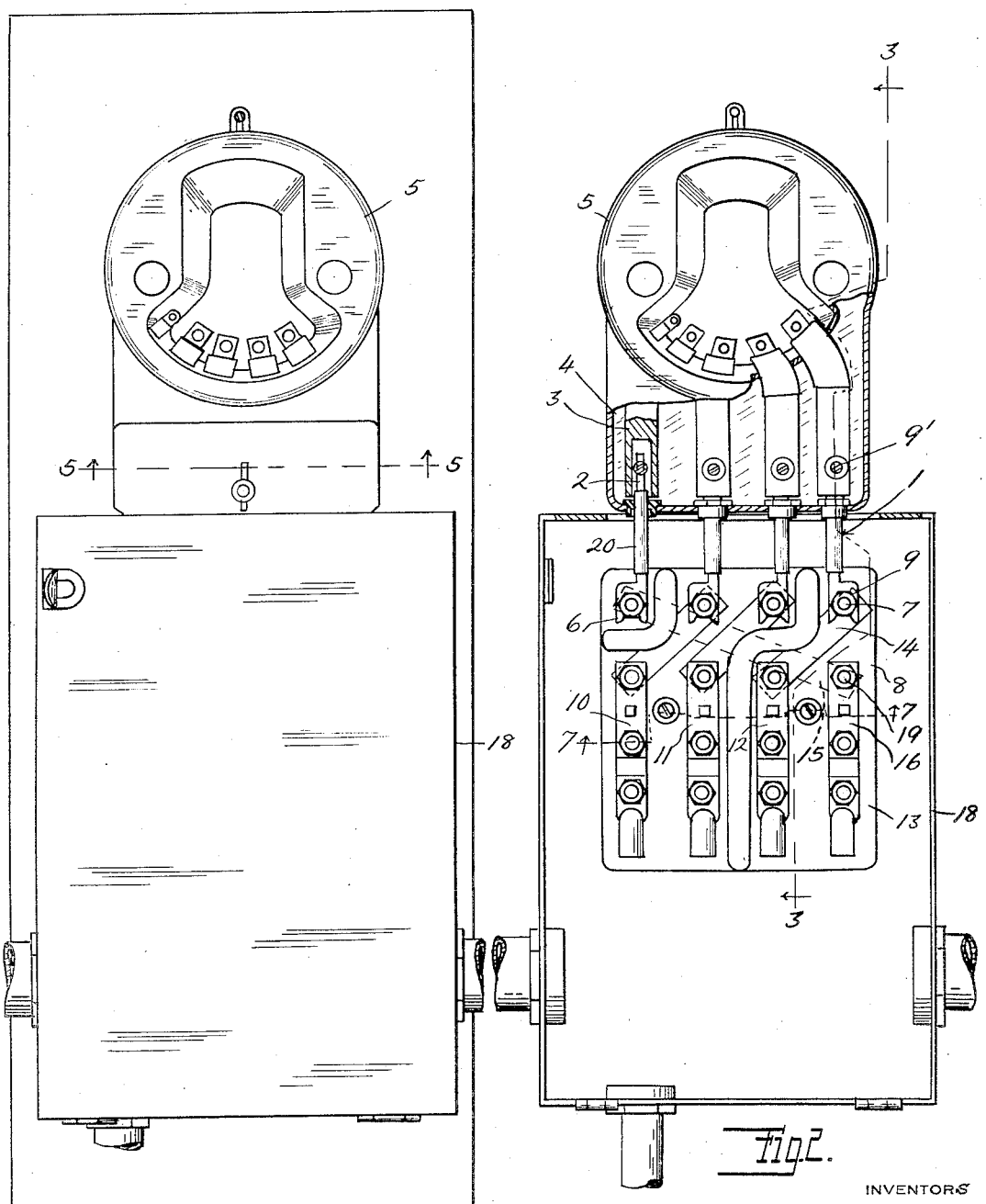

2,006,768

UNITED STATES PATENT OFFICE 2,006,768

METER BLOCK CONNECTER

John G. Jackson and Clement W. Wolf, Detroit, Mich., assignors to Square D Company, Detroit, Mich., a corporation of Michigan Application July 22, 1931, Serial No. 552,504

7 Claims. (Cl. 247—2)

This invention relates generally to electrical equipment and refers more particularly to meter block connecters.

In the accompanying drawings:

Figure 1 is a front elevation of equipment embodying my invention;

Figure 2 is a front elevation with the cover of the box removed and showing parts of the meter broken away;

Figure 3 is a sectional view taken on the line 3—3 of Figure 2;

Figure 4 is a rear elevation of the test block;

Figure 5 is a sectional view taken on the line 5—5 of Figure 1;

Figure 6 is a detail perspective view of one of the connecters;

Figure 7 is a section on the line 7—7 of Figure 2;

Figure 8 is a vertical sectional view through a modified construction and showing by dotted lines alternative positions of the meter and test block;

Figure 9 is a sectional view taken on the line 9—9 of Figure 8;

Figure 10 is an elevation of the supporting bracket for the test block.

Heretofore it has been customary to have strap type meter test blocks with parallel sets of connections including a removable strap or an openable link, such test block connections being connected at their upper ends to meter terminals by means of lengths of insulated wire, commonly called meter loops. Due to the fact that a difference in the sequence of connections in the meter terminal chamber and in the meter test block has become practically fixed and standard in the art it is ordinarily necessary in the installation of meter loops to cross over one or more of the conductors to adapt this meter terminal sequence to the desired test block sequence. This, together with other features incidental to the use of meter loop connections of the wire type has rendered it necessary to provide considerable space between the meter terminal chamber and test block terminal to permit proper installation of such meter loops.

We are aware that various meter block connecters of the plug-in type have been proposed in the past but such arrangements do not provide the proper test sequences of line and load wires and require the crossing or other re-arrangement of the test circuits from that which appears to be most generally accepted as standard in the industry.

In our device we provide a substitute for the usual type of meter loop connection in the form of comparatively short flat and flexible connection links 1 that are provided at one end with substantially straight end portions 2 for insertion into terminals 3 within the terminal chamber 4 of the meter 5 and are provided at their other ends with forked portions 6 for straddling the terminals 7 of the meter test block 8. Suitable nuts 9 threadedly engaging said terminals are used to fasten the forked portions 6 to the terminals 7 while suitable set screws 9' may be used to fasten the end portions 2 within the terminals 3 of the meter.

It will be noted that the connection just referred to is made without increasing the size of the test block and this has been accomplished by inclining to the right from the three left hand test links 10, 11 and 12 respectively to the three right hand terminals 7 upon the front face of the insulated base 13 of the test block three of the line and load terminal links 14, and embedding in the back of the base a fourth terminal link 15 that inclines to the left from the test link 16 at the extreme right hand of the base to the terminal 7 at the extreme left of the base, and so locating and spacing the block within its enclosing cabinet 18 that the test block terminals 7 shall be substantially opposite and symmetrically arranged relative to the corresponding meter terminals 3. Thus, due to the arrangement just referred to and the fact that the connecters 1 are formed of relatively soft copper and are inherently flexible, it is possible to accommodate the spacing of the terminals of meters to wider or narrower spacing of terminals of test blocks in a very simple manner.

Moreover, with the arrangement described it is possible to make practically direct connection from the meter terminals to the test block terminals and this not only permits of ready installation of the connecters 1 therebetween but, as will be evident from the illustration, such arrangement greatly reduces the spacing required between the meter and the test block. In fact, when connecters such as 1 are used it is not only desirable but necessary to use the particular type of test block with cross-over features as shown herein to secure the relatively opposite positioning of block terminals to meter terminals of the same polarity and sequence.

Heretofore the meter loop wires, particularly in sizes of No. 8 gage and larger, commonly employed in meter connections were usually in the form of stranded conductors and were usually soldered into terminal lugs. In practice such soldered lug connections proved objectionable and a common source of trouble due to the uncertainty as to the adequacy of the soldered connections and the fact that they were usually concealed from inspection. However, our type of meter block connecter not only avoids the necessity for a soldering operation but provides, without such plug additions, a flat contact surface to which tight connections may be made.

Preferably the links 1 are provided between the end portions 2 and 6 with a coating or sleeve 20 of insulating material and the forked portions 6 are preferably offset as shown, so that they may be interchangeably used upon either the left or the right hand side of the test block, as illustrated in Figure 2. It will also be noted that the forked end portions of the connecters provide sufficient longitudinal adjustment for the connecters to permit them to straddle the test block terminal 7 without removal of the nuts 9. Thus the connection between the meter and test block may be made after both such parts have been mounted in place. Moreover, by affixing the connecters to either the test block terminals 7 or to the meter terminals 3 either the meter or the test block may be connected to the other after it has been previously mounted in place. Thus the connecters 1 enable the meter and test block to be connected together efficiently, easily and quickly.

When employing relatively short connecters such as 1 that are non-flexible as to length (as would be the case if flexible wire meter loops were used) it becomes necessary when meters of different dimensions or depths are used to provide some adjustment to enable the connection between the test block and meter to be made. In Figures 8 to 10 inclusive we have illustrated a modification wherein the test block 30 constituting the service unit and the meter 31 are adjustable to compensate for meters of various dimensions. As shown, the test block 30 is adjustably mounted upon a bracket 32 and the latter as well as the block 30 and meter 31 are enclosed within a box or cabinet 33. Preferably the bracket 32 is channel-shaped and is provided with laterally extending flanges 34 and 35 respectively which are provided with longitudinally extending slots 36 and 37 respectively. A suitable insulation 38 is located between the test block 30 and the flanges 34 and 35 and the connection between the test block 30 and bracket 32 preferably comprises bolts 39 and 40 which extend through the slots 36 and 37 and are held in place by suitable nuts 41 and 42 respectively. Thus with this construction the test block 30 may be moved longitudinally on the bracket 32 toward and away from the meter 31, or the meter 30 may be adjusted in the cabinet 33 in a similar manner toward and away from the block 31, or both the block 31 and meter 30 may be adjusted to enable the connecters 1 to be used as such between the block 30 and meter 31. Thus, this relative adjustability between the parts provides a variety of mounting positions for a given test block or meter, entirely apart from the feature of accommodation to the cooperating mounting holes of a variety of meters or test blocks.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim as our invention is:

1. In service entrance equipment, a cabinet, a meter fixed in the cabinet and having suitable terminals, a bracket within and rigid with the cabinet in spaced relation to the meter, a test block adjustable on the bracket relative to the meter, and connecters fixed to the block and movable therewith for attachment to the terminals of said meter.

2. In service entrance equipment, a cabinet, a meter test block in the cabinet, and a support for said block within the cabinet and permitting the block to be adjusted in a predetermined direction relative to the cabinet.

3. In service entrance equipment, a cabinet, a meter test block in the cabinet, a bracket fixed to a wall of the cabinet, and a connection between said block and bracket permitting the block to move longitudinally of the cabinet.

4. In service entrance equipment, a cabinet, a bracket fixed to a wall of said cabinet and having lateral flanges provided with elongated slots, a meter test block adjustable longitudinally of the flanges, and means for holding the block in adjusted position including bolts extending through the block and slots.

5. Service entrance equipment including a test block having links of fixed length adapted to be connected to a meter, an enclosure for the test block and links, and mounting means within said enclosure for said test block providing adjustment thereof over a variable range of positions toward and from a meter to facilitate a connection of the links with a meter.

6. Service entrance equipment including a test block having links of fixed length adapted to be connected to a meter, and mounting means for said test block providing longitudinal adjustment thereof over a variable range of positions toward and from a meter to facilitate a connection of the links with a meter.

7. Service entrance equipment including a meter, a test block adjacent said meter and having links of fixed length adapted to be connected to said meter, an enclosure for the test block and links, and mounting means within said enclosure for said test block providing adjustment thereof over a variable range of positions toward and from said meter to facilitate a connection between the links and meter.

JOHN G. JACKSON.
CLEMENT W. WOLF.